UNITED STATES PATENT OFFICE 2,298,187

BAKING POWDER COMPOSITION

John C. Woodhouse, Cragmere, Del., assignor to E. I. du Pont de Nemours & Company, Wilmington, Del., a corporation of Delaware No Drawing. Application April 24, 1940,
Serial No. 331,413

16 Claims. (Cl. 99—95)

This invention relates to improvements in leavening agents and more particularly to the production of baking powders containing amides of the aliphatic organic acids.

Commercial baking powders have evolved, by and large, through the chemical development of so-called "baking acids." The reaction between these acids and baking soda gives carbon dioxide, the liberation of which is the primary function of the baking powder.

In accord with the present invention, it has been found that the amides of the aliphatic organic acids and more particularly the amides of the aliphatic organic hydroxy acids and mixtures thereof are excellent leavening agents when employed as "baking acids" with a baking carbonate and other ingredients such as corn, rice, potato starch, and the like. When so employed, they will produce biscuits, cakes, and other types of raised baked goods of excellent symmetry, bloom, crust color, grain, texture, and flavor.

The amides of the aliphatic organic acids which are used in the compositions of the present invention are the aliphatic organic acid amides, such, for example, as acetamide, and the amides of propionic, and higher branched and straight chain aliphatic organic acids including the higher acids of both the mono and dibasic series acids, such as, for example, lauric acid, adipic acid, and the like. More particularly the invention relates to the use of the amides of the oxy-substituted and hydroxy carboxylic acids, such, for example, as the amides of hydroxyacetic acid, lactic acid, citric acid, tartaric acid, methoxy acetic acid, methoxy methoxy acetic acid, and the like. These amides have the two-fold advantage of not only providing leavening action by the usual liberation of carbon dioxide, but also providing additional leavening action by the liberation of ammonia. The two-fold action is illustrated by the empirical equations:

$$RCONH_2 + H_2O \rightarrow RCOOH + NH_3\uparrow$$

$$RCOOH + NaHCO_3 \rightarrow RCOONa + H_2O + CO_2\uparrow$$

where R signifies the organic radical corresponding to members of the series designated above. Moreover, ammonia and ammonia derivatives tend to impart a more desirable brown crust to baked products.

The "baking acids" of this application may be used alone with a baking carbonate to give the desired leavening action or may be combined with acidic substances such, for example, as hydroxy- acetic, polyhydroxyacetic, lactic, citric, tartaric, and adipic acids and their acid sodium and ammonium and neutral and acid calcium salts, as well as cream of tartar, calcium acid phosphate, sodium acid pyrophosphate and sodium aluminum sulfate.

In baking powder compositions, there should usually be present in the order of from 25 to 40 parts of a baking carbonate, and 15 to 50 parts of the amide or a combination of the amide with one or more of the above designated "baking acids" per 100 parts of starch. If a combination "baking acid" is employed, that is, an organic acid amide plus one or more of the acidic substances mentioned above, the latter may be present in the ratio of from 10 to 100 parts thereof per 100 parts of the amide.

While major emphasis has been directed to the use of these aliphatic organic amides as leavening agents in baking powder, they may likewise be used in the preparation of self-rising flours, prepared cake mixtures, pancake flours, and similar products wherein a "baking acid" is required.

Several examples of baking powder are given to illustrate specific embodiments of the invention to which, however, the invention will not be limited. The numerals indicate parts by weight.

Example 1

| | |
|---|---:|
| Propionamide | 22.7 |
| Sodium bicarbonate | 26.7 |
| Starch | 50.6 |
| | 100.0 |

Example 2

| | |
|---|---:|
| Hydroxyacetamide | 23.4 |
| Sodium bicarbonate | 26.7 |
| Starch | 49.9 |
| | 100.0 |

Example 3

| | |
|---|---:|
| Adipamide | 22.9 |
| Sodium bicarbonate | 26.7 |
| Starch | 50.4 |
| | 100.0 |

Example 4

| | |
|---|---:|
| Lauramide | 63.7 |
| Sodium bicarbonate | 26.7 |
| Starch | 9.6 |
| | 100.0 |

The baking powder compositions designated in the examples and similar compositions may be used in all recipes requiring employment of baking powders. Representative bakes containing these compositions have given superior products.

I claim:

1. In a process of leavening, the step which comprises incorporating, as a leavening agent in the mass to be leavened, a baking carbonate and an aliphatic organic oxy-substituted carboxylic acid amide.

2. In a process of leavening, the step which comprises incorporating, as a leavening agent in the mass to be leavened, a baking carbonate and an aliphatic organic hydroxy-substituted carboxylic acid amide.

3. In a process of leavening, the step which comprises incorporating, as a leavening agent in the mass to be leavened, a baking carbonate and an aliphatic organic acid amide containing essential amounts of a compound selected from the group consisting of hydroxyacetic, lactic, citric, tartaric, and adipic acids and their acid sodium and ammonium, and neutral and acid calcium salts, cream of tartar, calcium acid phosphate, sodium pyrophosphate, and sodium aluminum sulfate.

4. A process of leavening food stuffs, which comprises incorporating, as a leavening agent in the mass to be leavened, a baking carbonate and an aliphatic organic acid amide.

5. A process of leavening food stuffs, which comprises incorporating, as a leavening agent in the mass to be leavened, a baking carbonate and an aliphatic hydroxy-substituted carboxylic acid amide.

6. In a process of leavening food stuffs, the step which comprises incorporating, as a leavening agent in the mixture to be leavened, adipamide and subsequently subjecting the mass to baking temperature.

7. In a process of leavening food stuffs, the step which comprises incorporating, as a leavening agent in the mixture to be leavened, a baking carbonate and propionamide and subsequently subjecting the resulting mixture to baking temperature.

8. In a process of leavening food stuffs, the step which comprises incorporating, as a leavening agent in the mixture to be leavened, a baking carbonate and hydroxyacetamide and subsequently subjecting the resulting mixture to baking temperature.

9. A baking powder containing a baking carbonate and an aliphatic organic acid amide.

10. A baking powder containing a baking carbonate and an aliphatic hydroxy-substituted carboxylic acid amide.

11. A baking powder containing a baking carbonate and an aliphatic methoxy-substituted carboxylic acid amide.

12. A baking powder containing baking carbonate and hydroxyacetamide.

13. A baking powder containing from 25 to 40 parts of a baking carbonate, from 15 to 50 parts of an aliphatic organic acid amide which contains per 100 parts of the amide from 10 to 100 parts of a compound selected from the group consisting of hydroxyacetic, lactic, citric, tartaric, and adipic acids and their acid sodium and neutral and acid calcium salts, cream of tartar, calcium acid phosphate, sodium pyrophosphate, and sodium aluminum sulfate.

14. A baking powder having approximately the composition:

|  | Parts |
|---|---|
| Propionamide | 22.7 |
| Sodium bicarbonate | 26.7 |
| Starch | 50.6 |
|  | 100.0 |

15. A baking powder having approximately the composition:

|  | Parts |
|---|---|
| Hydroxyacetamide | 23.4 |
| Sodium bicarbonate | 26.7 |
| Starch | 49.9 |
|  | 100.0 |

16. A baking powder having approximately the composition:

|  | Parts |
|---|---|
| Adipamide | 22.9 |
| Sodium bicarbonate | 26.7 |
| Starch | 50.4 |
|  | 100.0 |

JOHN C. WOODHOUSE.